United States Patent [19]
Berman et al.

[11] Patent Number: 5,768,418
[45] Date of Patent: Jun. 16, 1998

[54] UNINTENDED RESULTS DETECTION IN A PEN-BASED COMPUTER SYSTEM

[75] Inventors: Eric R. Berman, Redmond; Edward L. Mills, Bellevue; Derek E. Hoiem, Redmond, all of Wash.

[73] Assignee: Microsoft Corporation, Redmond, Wash.

[21] Appl. No.: 556,637

[22] Filed: Nov. 13, 1995

Related U.S. Application Data

[63] Continuation of Ser. No. 166,304, Dec. 10, 1993, abandoned.

[51] Int. Cl.$^6$ .............................. G06K 9/00; G06K 9/03
[52] U.S. Cl. .............................. 382/187; 382/311; 382/189
[58] Field of Search .............................. 382/186, 187, 382/309–311, 313, 189; 364/705.03, 709.11, 709.01; 345/175, 179, 180–183

[56] References Cited

U.S. PATENT DOCUMENTS

| | | | |
|---|---|---|---|
| 4,573,196 | 2/1986 | Crane et al. | 382/13 |
| 4,674,065 | 6/1987 | Lange et al. | 382/57 |
| 5,121,441 | 6/1992 | Chefalas et al. | 382/13 |
| 5,252,951 | 10/1993 | Tannenbaum et al. | 345/173 |
| 5,315,667 | 5/1994 | Fujisaki et al. | 382/13 |
| 5,550,930 | 8/1996 | Berman et al. | 382/187 |
| 5,615,284 | 3/1997 | Rhyne et al. | 382/187 |

OTHER PUBLICATIONS feature of MS Word 2.0, Microsoft Corporation, Redmond, Washington, Oct. 1991.

IBM Technical Disclosure Bulletin, vol. 34, No. 9, Feb., 1992, "Method for Inputting Ambiguously Shaped Characters in Online Handwritten Character Recognition."

Carr, Robert M., *Handwritting Recognition in the GO Operating System*, Compcon '91, Proceedings of the Thirty–Sixth IEEE Computer Society International Conference, Feb. 25–Mar. 1, 1991, pp. 483–486.

*Primary Examiner*—Leo H. Boudreau
*Assistant Examiner*—Bhavesh Mehta
*Attorney, Agent, or Firm*—Seed and Berry LLP

[57] ABSTRACT

An improved mechanism for converting handwritten input data into text and commands in a computer system is provided. An unintended results detection component is used after the handwritten data has been converted to text and commands. The unintended results detection component determines when the converted text and commands were likely unintended by the computer user. If the unintended results detection component determines that the converted text and commands were likely unintended by the computer user, the unintended results detection component outputs an indication to the user. The user then has the option of accepting or rejecting the interpretation of the system of the handwritten input data.

23 Claims, 10 Drawing Sheets

1

UNINTENDED RESULTS DETECTION IN A PEN-BASED COMPUTER SYSTEM

CROSS-REFERENCE TO RELATED APPLICATION

This application is a continuation of U.S. Pat. application Ser. No. 08/166,304, filed Dec. 10, 1993, now abandoned.

TECHNICAL FIELD

The present invention relates generally to data processing systems and, more particularly, to data entry in a pen-based computer system.

BACKGROUND OF THE INVENTION

Handwriting recognition systems allow users to input handwritten data into a computer. Such handwriting recognition systems are provided in electronic tablets which allow users to handwrite data that the computer can recognize. A user writes data on the electronic tablet with a pen input device. When the pen input device moves across the tablet, the tablet illuminates pixels that reflect pen movement. The tablet is divided into a plurality of discrete positions, and the tablet senses the consecutive positions of the pen as the user writes. After sensing the positions of the pen, the tablet sends the positions to the computer. The computer receives the positions and converts the pen movements into recognized input symbols, such as letters or numbers, having a convenient format, like ASCII (this process is known as "recognition"). The computer then processes the recognized input symbols.

Some handwriting recognition systems recognize not only hand-drawn characters, letters, and punctuation, but also gestures. Gestures are hand-drawn symbols that are typically used to represent editing commands or to produce non-printing text. For example, a handwritten backslash over a letter may mean delete the letter, a caret in between two letters may mean insert text, and a dash through a word may mean delete the word. Gestures are used extensively when printed documents are edited in a system that includes handwriting recognition. During recognition, gestures are converted into a usable format for use by the computer.

FIG. 1 depicts a conventional handwriting recognition system. The conventional system contains an application program 104, a control program 106, and a recognizer program 108. Both the control program 106 and the recognizer program 108 reside within the operating system 102. The control program 106 detects when the pen touches the tablet and also illuminates the pixels corresponding to the pen position while the pen is touching the tablet. The control program 106 gathers position data and upon the user terminating the handwriting input (by not touching the pen to the tablet for a short time), sends the position data to the recognizer program 108. The recognizer program 108 is responsible for recognizing the handwritten (position) data. The recognizer program 108 performs recognition by mapping the handwritten data to prototypes of symbols. Each prototype is a representation of the corresponding symbol. For example, a pen-based system designed to recognize capital letters has at least 26 prototypes (i.e., one prototype for each letter). After recognition, the application program 104 receives the recognized (converted) text and commands from the recognizer program 108. The application program 104 is any program capable of accepting keyboard data; for example, a word processing program. The application program 104, the control program 106, the recognizer program 108 and the operating system 102 reside within the memory 100 of a computer system.

FIG. 2 shows a system flowchart of the steps performed by a conventional system for entering handwritten data into a computer system. First, handwritten data is entered into the computer system using the pen input device as described above (step 201). The handwritten data is then sent to the control program 106 (step 202). Next, the control program 106 sends the handwritten data to the recognizer program 108 (step 204). The recognizer program 108 converts the handwritten data into text and commands (step 206). After conversion, the control program 106 receives the converted text and commands and sends the converted text and commands to the application program 104 (step 208). The application program 104 can then use the converted text and commands for normal processing.

During the conversion of handwritten data into text and commands, oftentimes the converted text and commands are not what the user intended (i.e., unintended results). There are three types of unintended results: misrecognition, inherent misrecognition and nonsense recognition. Misrecognition refers to when the recognizer program 108 misinterprets the handwritten data. Misrecognition is typically due to the differences in user handwriting styles over the prototype and to the legibility of the handwriting. Also, misrecognition occurs when users incorrectly draw a gesture. Inherent misrecognition refers to misrecognition by the system due to characteristics of the character set. For example, the difficulty of distinguishing between the characters "o," "O," and "0" is due to the similarities between the characters. Nonsense recognition refers to when the handwriting of the user is converted into what the user wrote, but not what the user intended to write. For example, a user may write a word with a "?" in the middle of the word. Although the handwriting is correctly converted into text and commands, most likely the user did not intend to write a word with a "?" in the middle.

SUMMARY OF THE INVENTION

In accordance with a first aspect of the present invention, a method is executed in a computer system having a pen input device. In accordance with this method of the first aspect of the present invention, handwritten data is received into the computer system from the pen input device. After receiving the handwritten data, this method converts the received handwritten data and determines if the converted data is likely unintended by a computer user. If this method determines that the converted data is likely unintended by the computer user, this method outputs an indication that the converted data was likely unintended by the computer user and this method outputs the converted data.

In accordance with a second aspect of the present invention, the pen-based computer system includes a pen input device, a control unit, a translation unit, and a processing unit. The pen input device is connected to the computer system. The control unit resides within the computer system and provides for receiving handwritten data from the pen input device, for determining when converted data is likely unintended by a computer user and for querying the computer user whether to accept the converted data when the converted data was likely unintended by the computer user. The translation unit resides within the computer system and provides for converting handwritten data received from the control unit into converted data. The processing unit resides within the computer system and provides for receiving the converted data from the control unit and for processing the converted data.

DETAILED DESCRIPTION OF THE INVENTION

The preferred embodiment of the present invention provides an improvement over the prior art for converting handwritten data into text and commands within a computer system. The preferred embodiment of the present invention increases the accuracy of the computer system in recognizing handwritten data by querying the computer user when the converted data was likely unintended by the computer user. A heuristic is provided in the preferred embodiment of the present invention to determine when the converted data was likely unintended by the computer user.

In prior methods, when unintended results are generated, the unintended text and commands are still sent to the application program. This can have undesirable effects. For example, when the application program is a word processor and the user inputs a handwritten undo command ("γ"), the system may misrecognize the undo command and send an "r" to the word processor. This misrecognition becomes more serious when the user has just inadvertently deleted significant amounts of text or made some other inadvertent significant changes. The effects of a misrecognition are magnified in computer systems that have an undo buffer that can contain only one command. Therefore, if a user inadvertently makes a significant change and inputs an undo command that is misrecognized, the undo buffer would contain an "r" and the previous undo buffer would be lost, thus making a correction of the mistake difficult for the user. Prior systems have attempted to solve only the misrecognition problem by modifying the recognizer program. However, the preferred embodiment of the present invention solves the misrecognition problem as well as the broader problem of unintended results by querying the user when possible unintended results are generated, thus providing greater accuracy in converting handwritten data to text and commands. The preferred embodiment detects three types of unintended results: misrecognition, inherent misrecognition and nonsense recognition.

Figure 1:
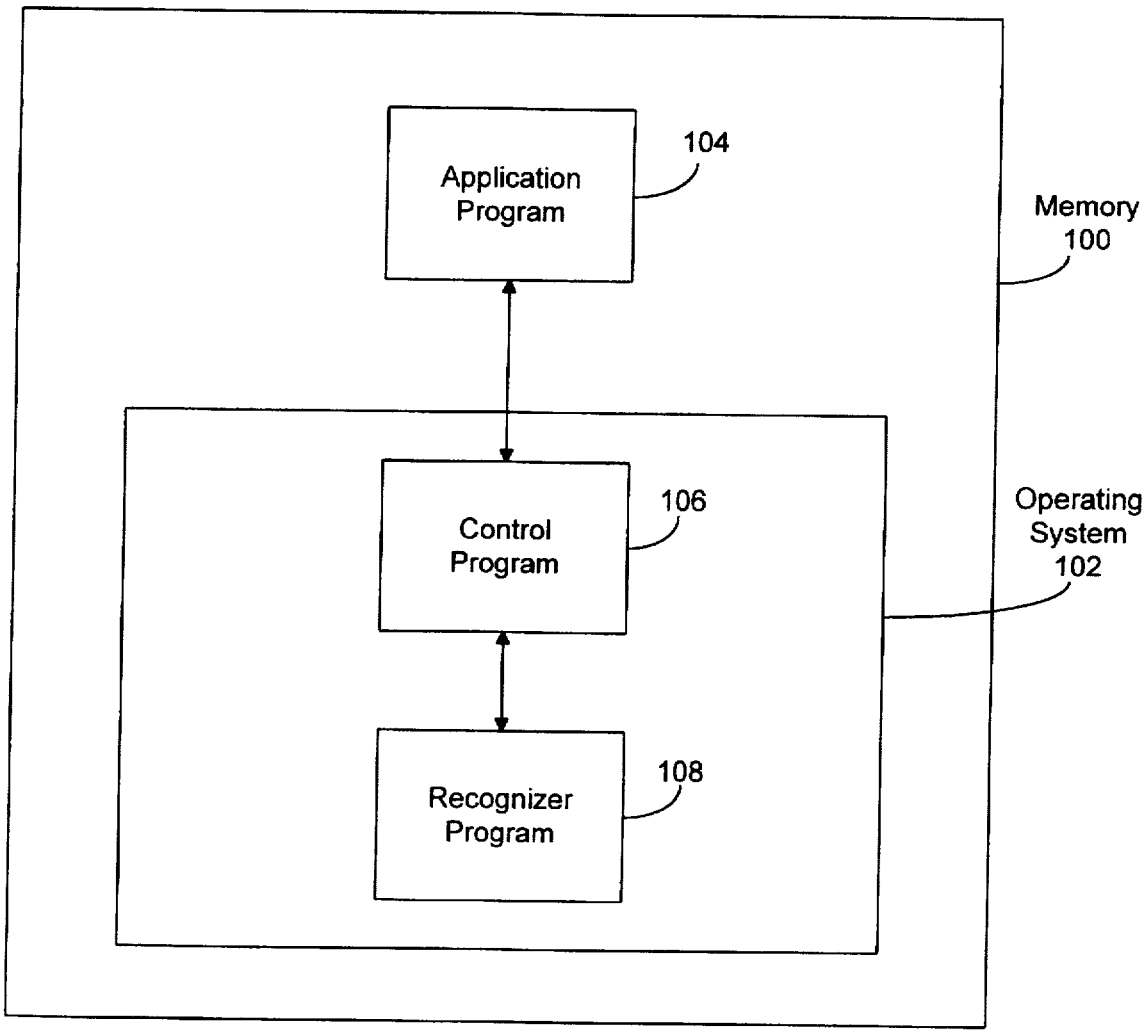
FIG. 1 depicts a block diagram of a conventional pen-based computer system.
Figure 2:
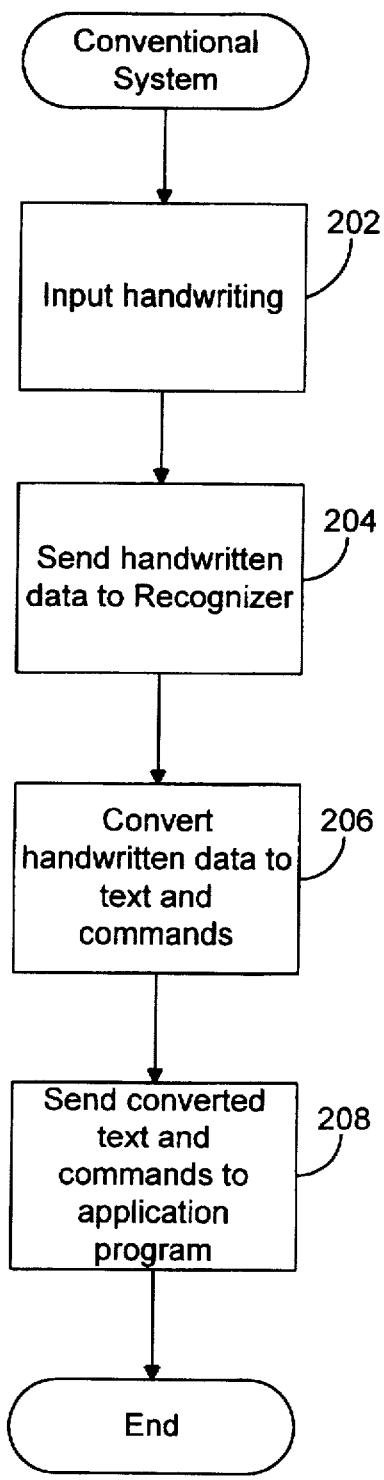
FIG. 2 depicts a flow chart of the steps performed in a conventional pen-based computer system.
Figure 3:
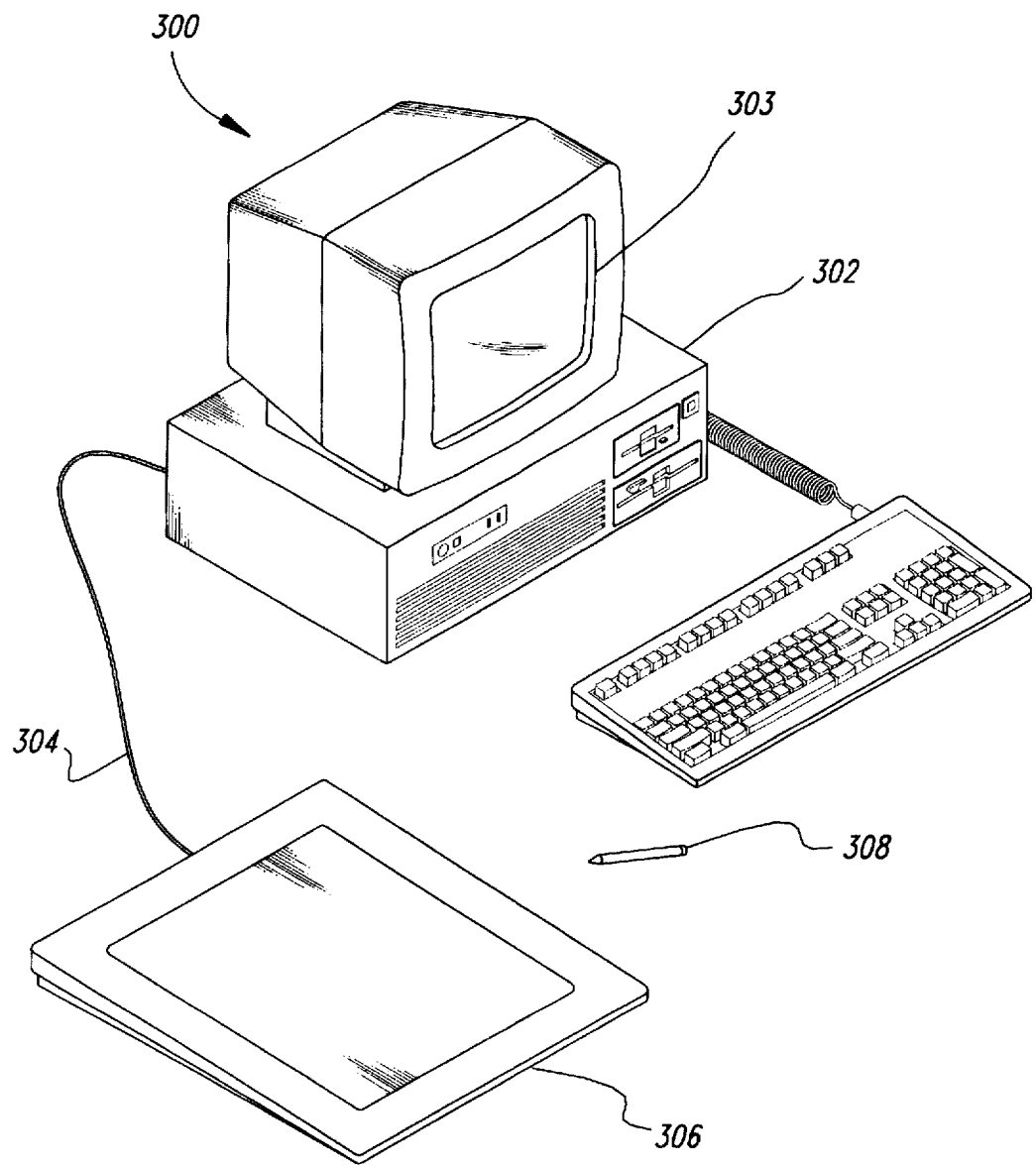
FIG. 3 depicts a computer system suitable for practicing the preferred embodiment of the present invention.

FIG. 3 depicts a computer system 300 that is suitable for practicing the preferred embodiment of the present invention. The computer system 300 includes a computer 302, a pen 308, a digitizing tablet 306, a screen display 303, and a connecting cable 304. The tablet 306 detects contact of the pen 308 with the tablet 306. The tablet 306 is divided into a grid of discrete points, each position having associated coordinates. When the tablet 306 detects contact by the pen 308, the tablet 306 sends the coordinates of the contact point to the computer 302 through the connecting cable 304. Upon receiving the coordinates, the computer 302 "inks" the contact point, that is, the computer 302 sends data to the tablet 306 to distinguish a pixel on the tablet 306 that corresponds to the contact point. In addition, the computer 302 "inks" the contact point that corresponds to the screen display 303 of the computer 302. To a user, the inking of the contact point looks as if the pen writes the point onto the tablet 306 where the pen 308 made contact as well as the corresponding point on the screen display 303 of the computer 302.

Although the preferred embodiment of the present invention is described as being implemented on a personal computer, one skilled in the art will recognize that the present invention could be implemented on other computers, including, but not limited to, mainframes, workstations, portables, laptops, and hand-held computers.

The preferred embodiment of the present invention resides on a computer system that is executing a version of the Microsoft Windows Operating System, which is sold by Microsoft Corporation of Redmond, Wash. The Microsoft Windows Operating System is a multitasking, multiwindows operating system. Multitasking refers to the ability of an operating system to have multiple programs (i.e., tasks) operating concurrently. Multiwindows refers to an environment wherein each application program is assigned a window. The windows for several programs can be shown on the screen display simultaneously. One kind of window that appears in window-based computer systems is the pop-up window. The pop-up window is a short-lived window that appears ("pops-up") upon the occurrence of an event and requests the user to perform some action. Although the preferred embodiment of the present invention is described as being implemented on a computer system with the Microsoft Windows Operating System, one skilled in the art will recognize that the present invention can be implemented on other operating systems.

Figure 4:
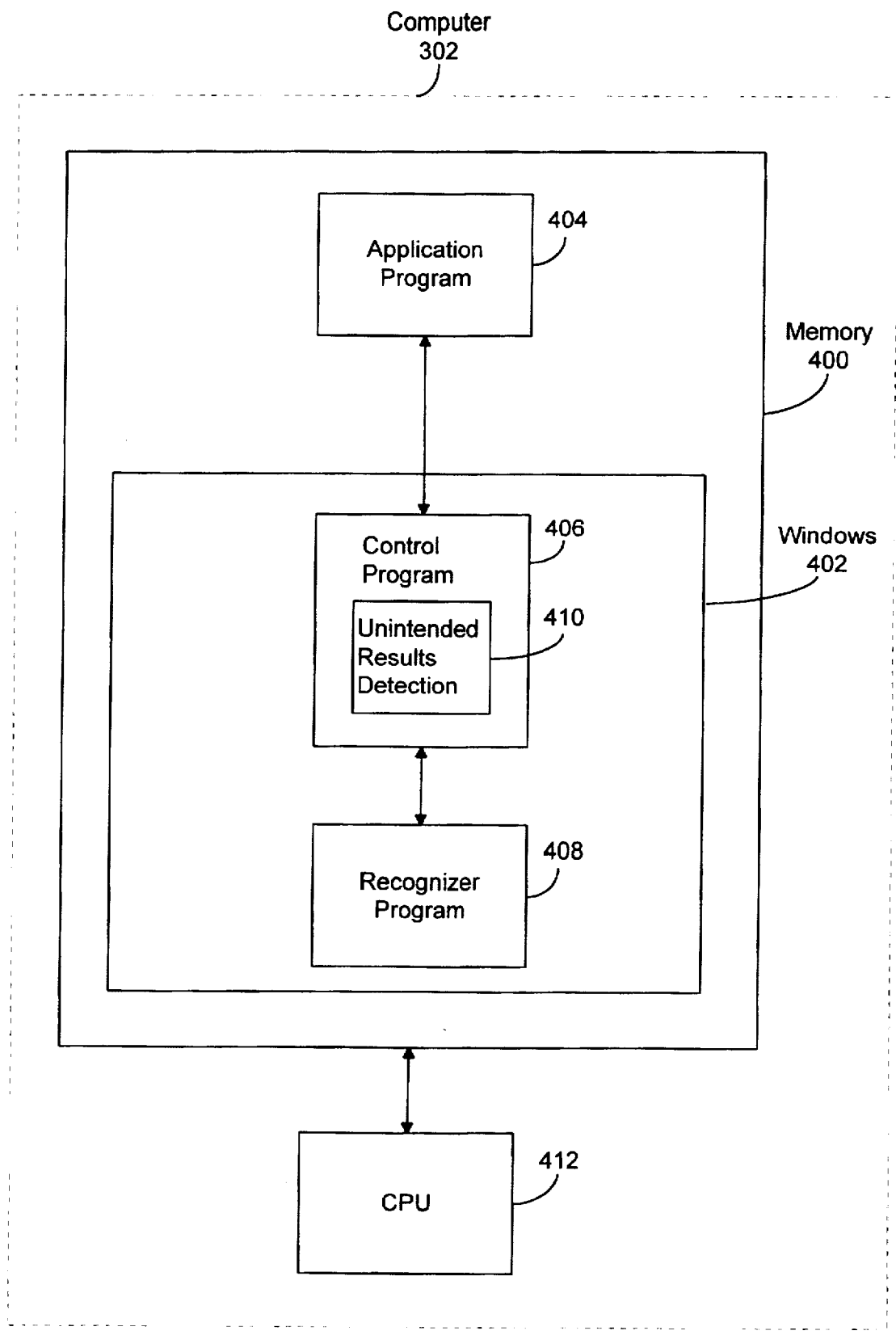
FIG. 4 depicts a block diagram of a computer system suitable for practicing the preferred embodiment of the present invention.

FIG. 4 shows a more detailed block diagram of computer 302. The computer 302 contains memory 400 and a central processing unit (CPU) 412. The memory 400 of computer 302 contains the Operating System 402 and an application program 404. The Operating System 402 has a number of programs, two of which are particularly relevant here: the control program 406 and the recognizer program 408. The control program 406 contains an unintended results detection component 410, which will be described in more detail below.

Figure 5A:
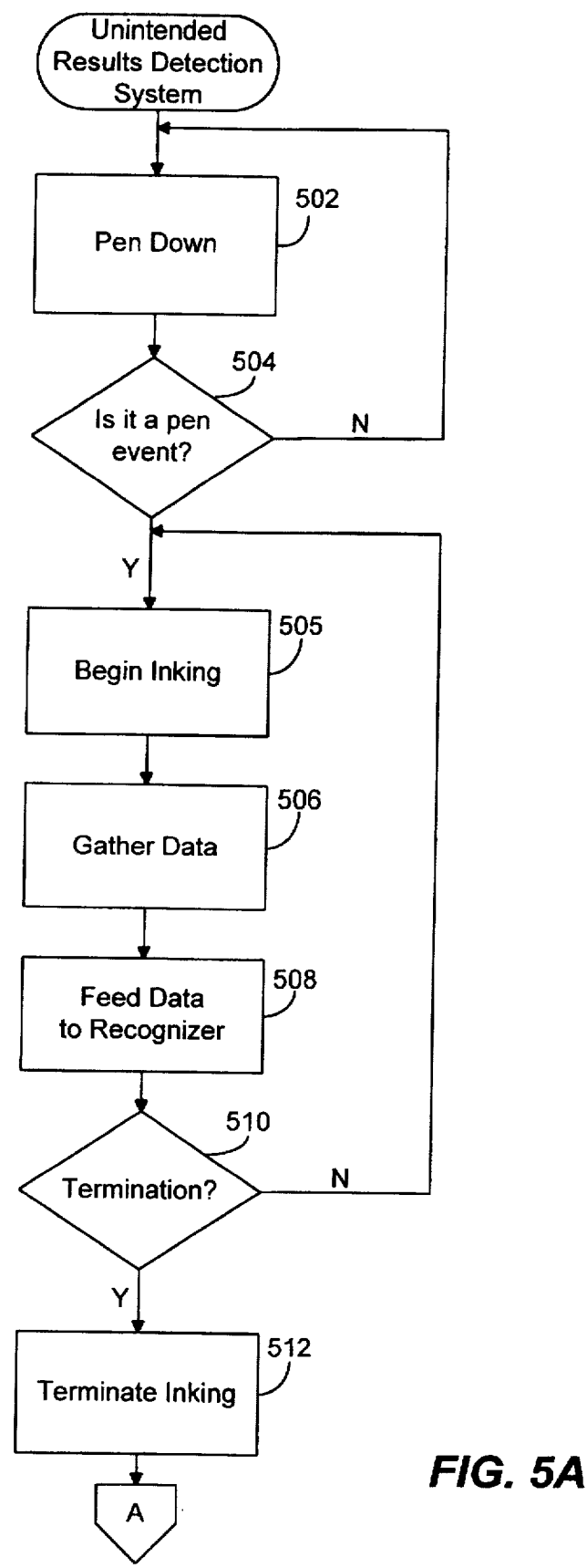
FIGS. 5A and 5B depict a flow chart of the steps performed by the preferred embodiment of the present invention for converting handwritten data into text and commands.
Figure 5B:
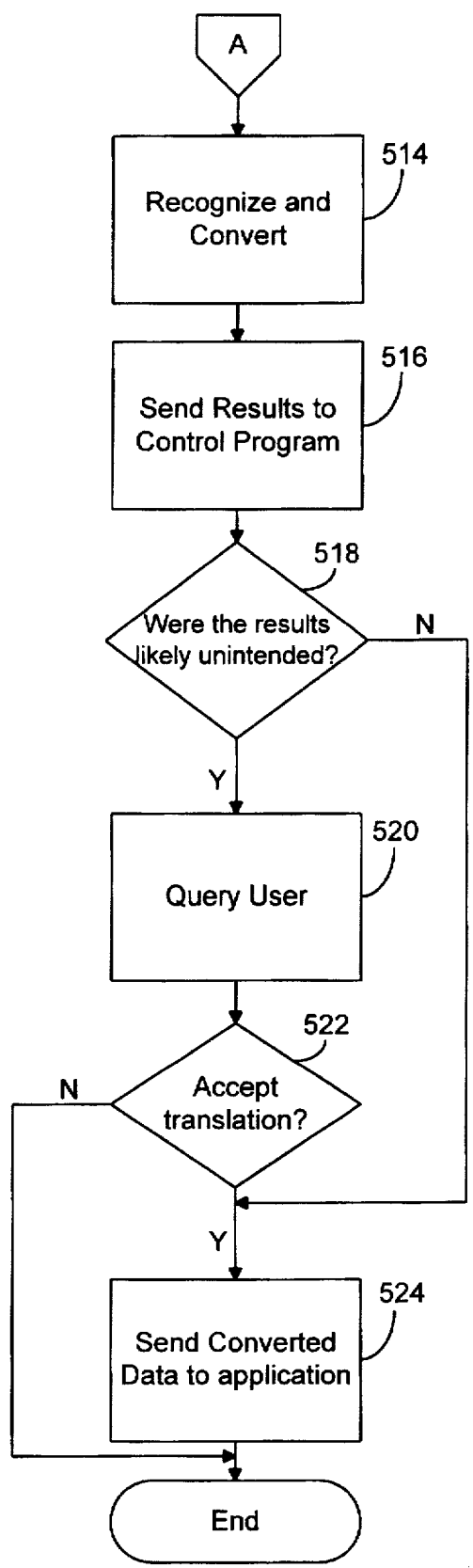

FIGS. 5A and 5B show a system level flowchart of the steps performed by the preferred embodiment of the present invention to bring converted text and commands that were likely unintended by a computer user to the attention of the computer user. When the user touches pen 308 to tablet 306, the control program 406 receives a message informing the control program of a pen down event (step 502). The control program 406 then determines whether the pen down event was for a pen or for another input device (step 504). If the pen down event was due to an input device other than a pen, the system waits for another event (step 502). However, if the pen down event was generated by a pen, the control program begins inking the screen display 303 of the computer system 302 (step 505). Inking is a well-known technique in the computer industry. Then, the control program starts to gather the handwritten input data (step 506) and sends the data to the recognizer program 408 (step 508). The control program 406 tests for termination of the handwritten input data (step 510). Termination can occur by either the user picking up the pen 308 (i.e., removing it from the surface of the tablet) or by expiration of a preset period of time of inactivity after the pen 308 is lifted from the surface of the tablet 306. If termination is not detected, the control program 406 continues to gather data (step 506). However, if termination is detected, the control program terminates inking of the display screen (step 512) and invokes the recognizer program 408 to convert the handwritten data into text and commands (step 514 in Figure 5B). After the recognizer program 408 has completed conversion, the recognizer program 408 sends the converted text and commands to the control program 406 (step 516).

After the recognizer program 408 sends the converted text and commands to the control program 406, the control program 406 invokes unintended results detection 410 to determine if the converted text and commands were likely unintended by the computer user (step 518). If the converted text and commands were not likely unintended by the computer user, the control program 406 sends the converted text and commands to the application program 404 (step 524). However, if unintended results detection 410 determines that the converted text and commands were likely unintended by the computer user, unintended results detection 410 queries the user whether to accept or reject the converted text and commands (step 520). Unintended results detection 410 determines whether the user accepted or rejected the converted text and commands (step 522). If the user accepted the converted text and commands, unintended results detection 410 allows the control program 406 to send the converted text and commands to the application program 404 (step 524). However, if the user did not accept the converted text and commands, unintended results detection 410 does not send the converted text and commands to the application program 404, thereby discarding the converted text and commands (step 622).

Figure 6A:
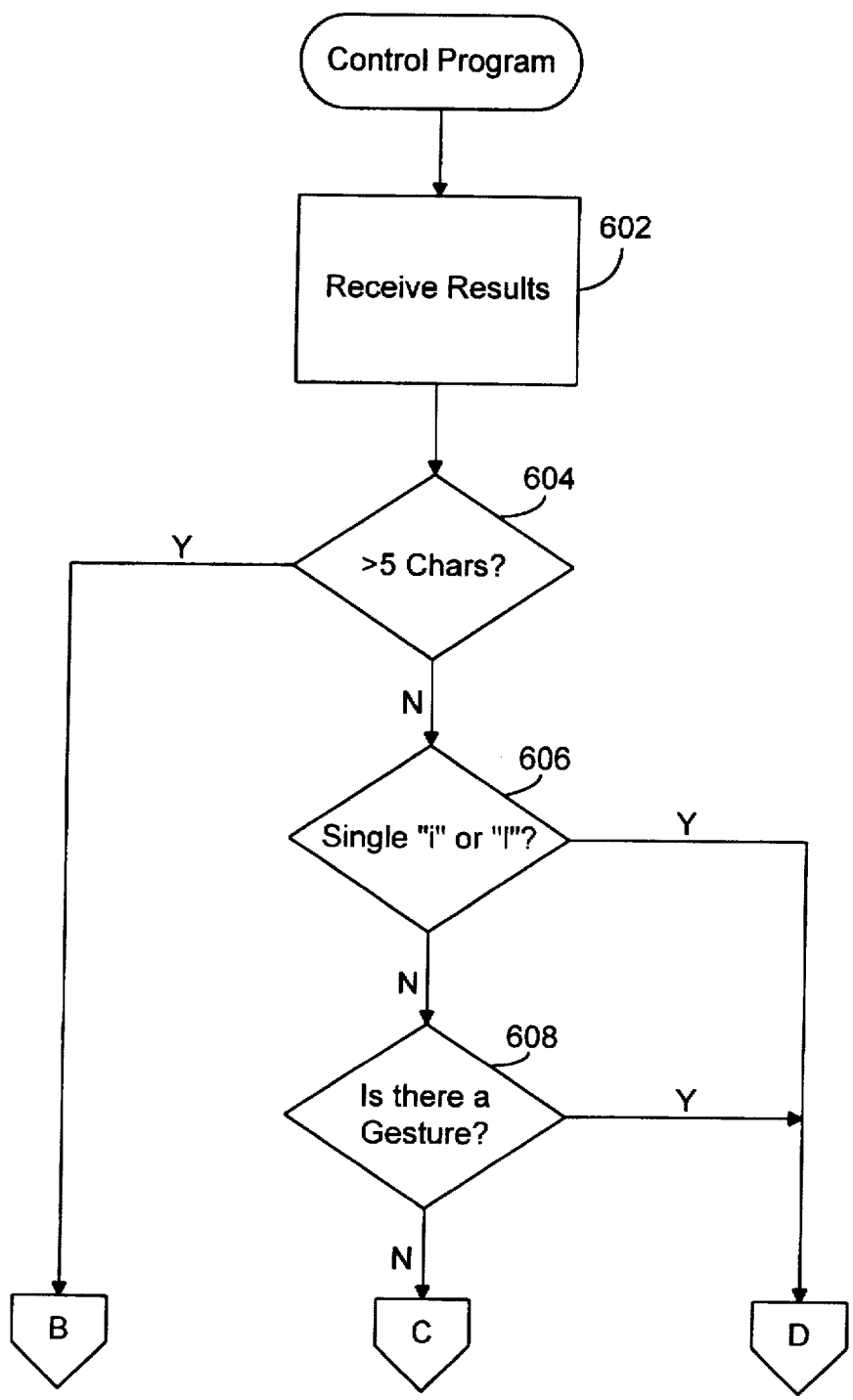
FIGS. 6A and 6B depict a flow chart of the steps performed by the control program of the preferred embodiment of the present invention.
Figure 6B:
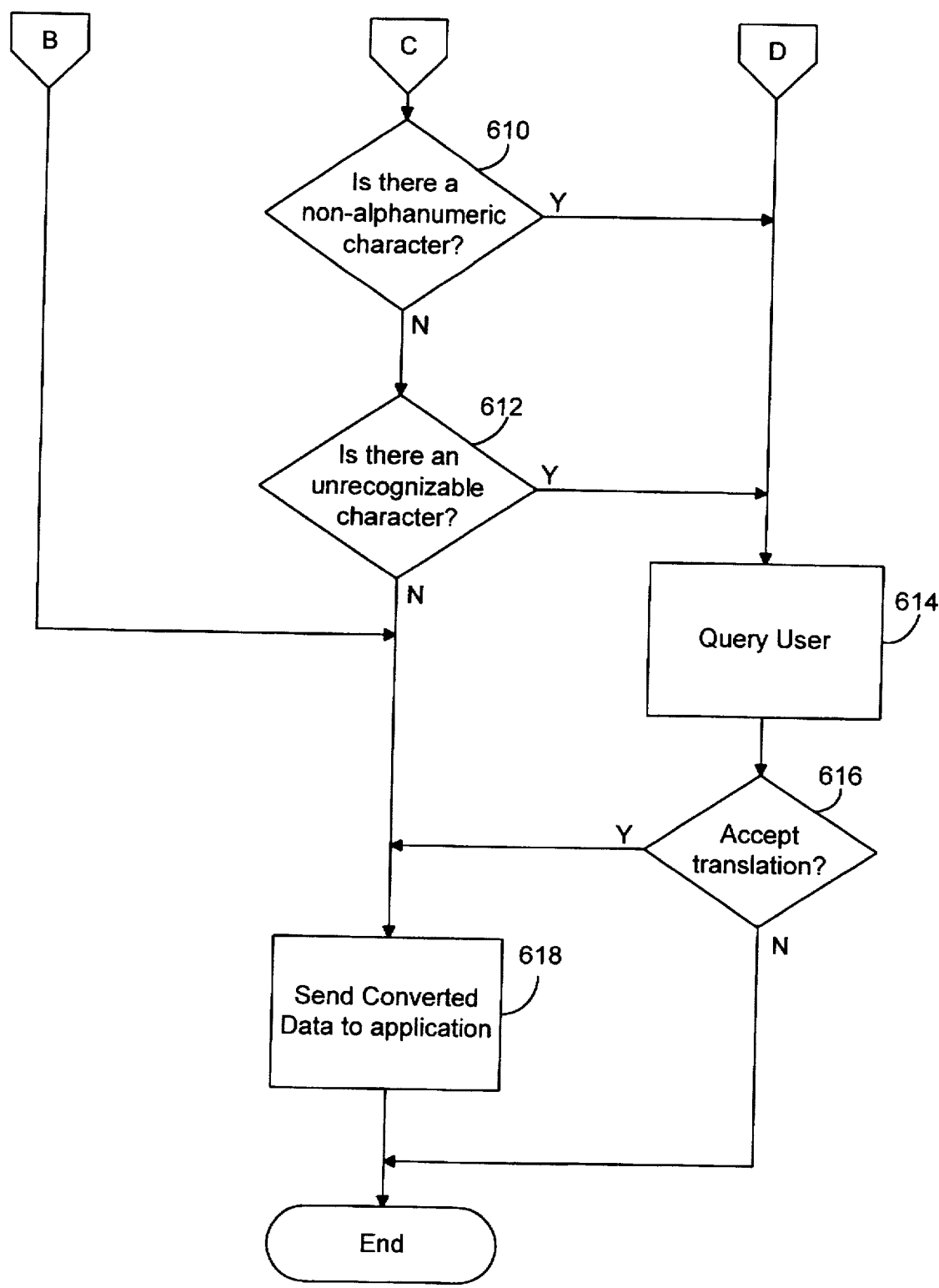

FIGS. 6A and 6B depict a flowchart of the steps performed by the control program 406 which includes unintended results detection. The rules described herein for the preferred embodiment of the present invention are merely illustrative and should not be construed to limit the scope of the present invention. The rules chosen reflect a heuristic approach to an empirical solution of the unintended results problem. The number of rules used was minimized to limit the effect on processing time, but each rule was carefully chosen to maximize efficiency.

After receiving the converted text and commands from the recognizer program 408, the control program 406 invokes unintended results detection 410 (step 602). Unintended results detection 410 determines whether the converted text and commands contain more than five characters (step 604). If the converted text and commands contain more than five characters, unintended results detection 410 sends the converted text and commands to the application program 404 (step 618). If the converted text and commands contain less than five characters, unintended results detection 410 determines if the converted text and commands contain a single "i" character or a single "l" character (step 606). The test for a single "i" character or a single "l" character is performed because of the easy misrecognition of a "flick" gesture. A "flick" gesture is an upward or downward stroke that is used for scrolling. If the converted text and commands do not contain a single "i" character or a single "l" character, unintended results detection 410 determines if the converted text and commands contain a gesture (step 608).

If the converted text and commands do not contain a gesture, unintended results detection 410 determines if the converted text and commands contain a non-alphanumeric character (step 610 in FIG. 6B). A non-alphanumeric character is a character that is not a letter (i.e., a member of the Roman alphabet) or a digit. Although the preferred embodiment of the present invention is described as being used with the Roman alphabet, one skilled in the art will recognize that other alphabets may be used. If the converted text and commands do not contain a non-alphanumeric character, unintended results detection 410 determines if the converted text and commands contain an unrecognizable character (step 612). An unrecognizable character is a symbol for which there is no prototype (e.g., a squiggle). If the converted text and commands do not contain an unrecognizable character, unintended results detection 410 allows the control program 406 to send the converted text and commands to the application program 404 (step 618). However, if the converted text and commands contain a single "i" character or a single "l" character, if the converted text and commands contain a gesture, if the converted text and commands contain a non-alphanumeric character, or if the converted text and commands contain an unrecognizable character, unintended results detection 410 displays a pop-up window to the user which displays the converted text and commands and allows the user to either accept the converted text and commands or reject the converted text and commands (step 614). Unintended results detection 410 determines whether the user has accepted the converted text and commands or rejected the converted text and commands (step 616). If the user accepts the converted text and commands, unintended results detection 410 allows the control program 406 to send the converted text and commands to the application program 404 (step 618). However, if the user rejects the converted text and commands, unintended results detection 410 does not allow the control program 406 to send the converted text and commands to the application program 404, thereby discarding the converted text and commands.

Figure 7:
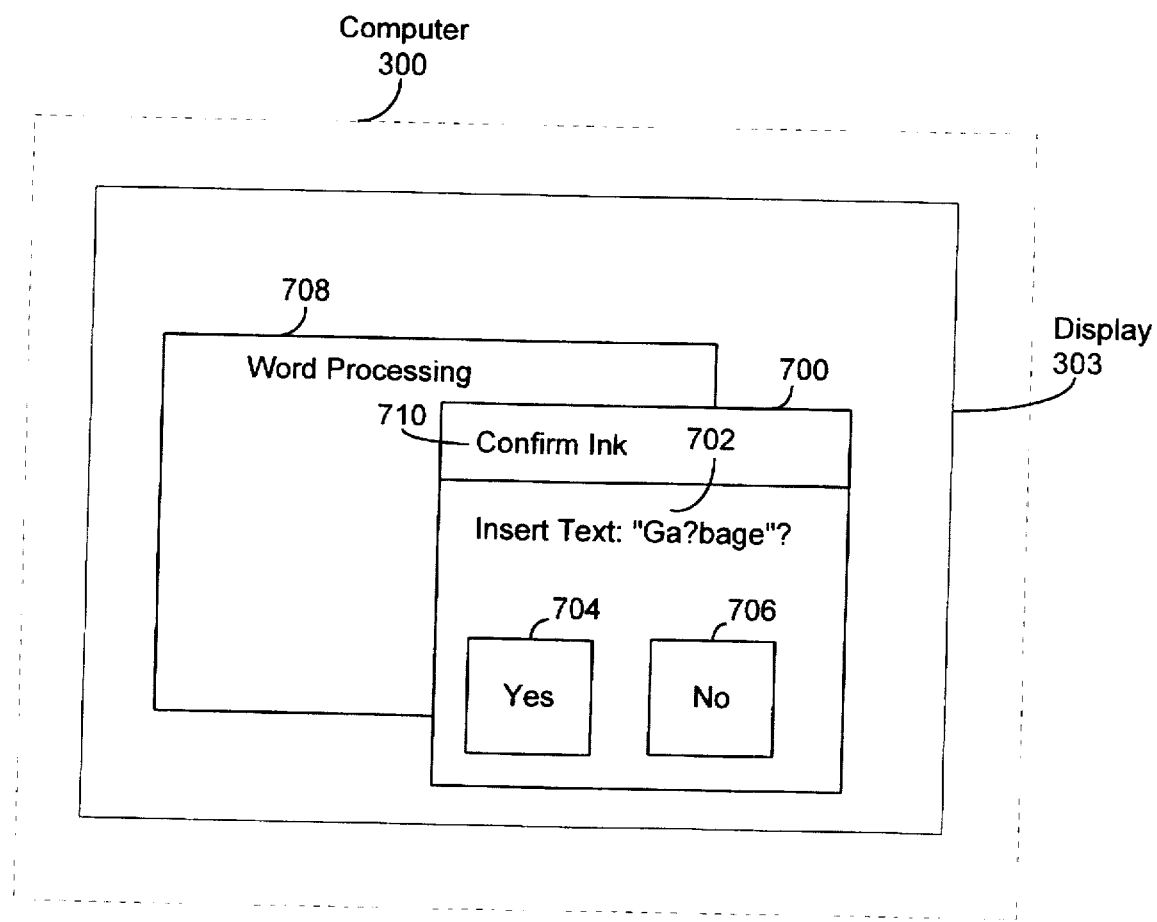
FIG. 7 depicts a pop-up window displayed by the preferred embodiment of the present invention.

FIG. 7 depicts an example pop-up window of the preferred embodiment of the present invention. The pop-up window 700 is displayed on the screen display 303 of computer 300. The pop-up window 700 is displayed over the window 708 corresponding to the application program 404. In this example, the application program 404 is a word processor 708. The pop-up window 700 displays an indication 710 that the converted text and commands were likely unintended, the converted text and commands 702, and two buttons: the accept button 704 and the reject button 706. The accept button 704 allows the user to accept the converted text and commands. The reject button 706 allows the user to reject the converted text and commands.

Figure 8:
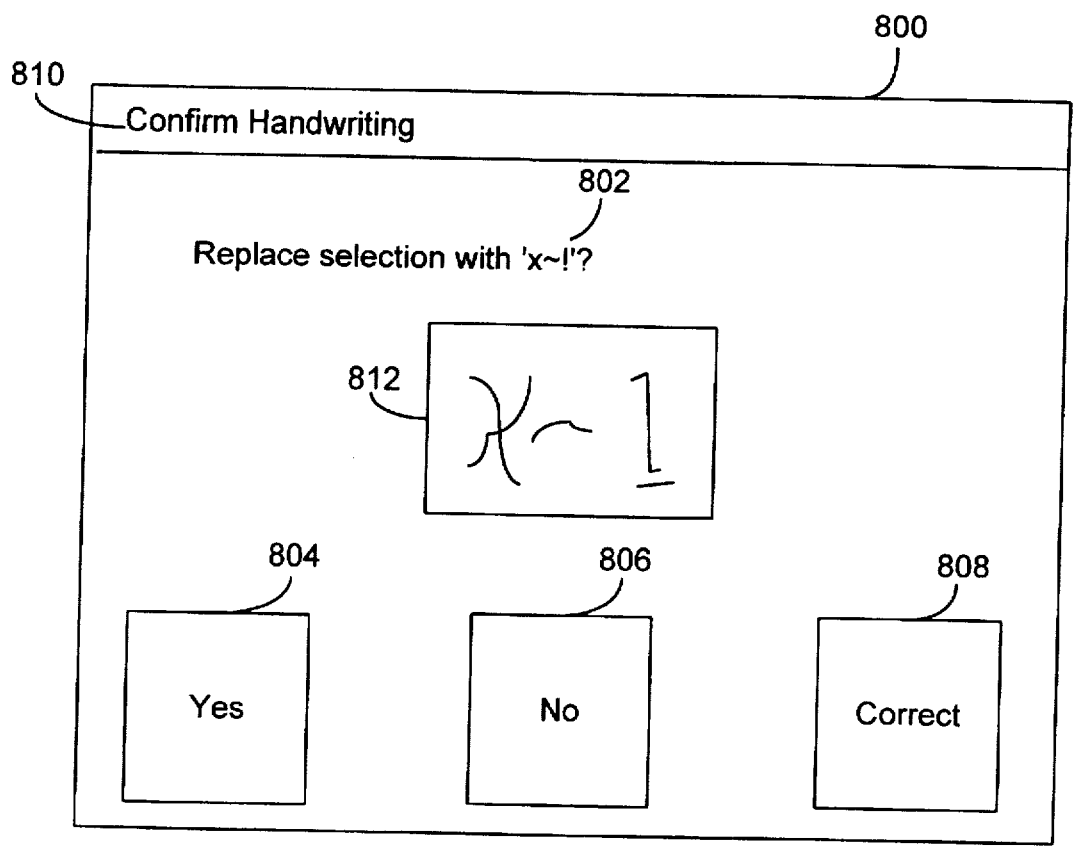
FIG. 8 depicts a pop-up window displayed by an alternative embodiment of the present invention.

FIG. 8 depicts an alternative embodiment of the pop-up window 700 of the present invention. The pop-up window 800 of the alternative embodiment displays an indication 810 that the converted text and commands were likely unintended, the converted text and commands 802, the handwritten data 812, and three buttons: the accept button 804, the reject button 806 and the correct button 808. The accept button 804 allows the user to accept the converted text and commands. The reject button 806 allows the user to reject the converted text and commands. The correct button 808 allows the user to edit the handwritten data 812.

Although the preferred embodiment of the present invention is described as displaying a pop-up window, other embodiments may display other windows, messages or indications, and other output devices may be used such as printers or sound devices. Further, although the preferred embodiment of the present invention displays the converted text and commands, other embodiments of the present invention may display a best choice of the converted text and commands along with alternate choices of converted text and commands.

While the present invention has been described with reference to a preferred embodiment thereof, those skilled in the art will know of various changes in form that may be made without departing from the spirit and scope of the claimed invention as defined in the appended claims.

We claim:

1. In a computer system, having a pen input device used by a computer user for inputting handwritten data, a handwritten data recognition component, and an output device, a method comprising the computer-implemented steps of:

receiving handwritten data from the pen input device containing at least one handwritten character;

recognizing the received handwritten data by the handwritten data recognition component to produce a recognized symbol representing the received handwritten data;

automatically analyzing the recognized symbol of the received handwritten data in order to detect potential misrecognition of the received handwritten data by the handwritten data recognition component; and when the analysis of the recognized symbol determines that the received handwritten data was potentially misrecognized, outputting an indication on the output device that the received handwritten data was potentially misrecognized by the handwritten data recognition component by displaying the recognized symbol;

when the computer user indicates to accept the recognized symbol, providing the recognized symbol as a recognition of the received handwritten data; and when the computer user indicates to reject the recognized symbol, inputting from the computer user an intended symbol for the received handwritten data and providing the intended symbol as a recognition of the received handwritten data.

2. The method as recited in claim 1 wherein the step of analyzing the recognized symbol of the received handwritten data in order to detect potential misrecognition includes the step of:

determining that the recognized symbol was not likely unintended by the computer user if the recognized symbol has more than a predetermined number of characters.

3. The method as recited in claim 1 wherein the step of analyzing the recognized symbol of the received handwritten data in order to detect potential misrecognition includes the step of:

determining that the recognized symbol was likely unintended by the computer user if the recognized symbol contains a converted character that is part of a set of characters that are likely misrecognized.

4. The method as recited in claim 1 wherein the handwritten data contains a gesture, and wherein the step of analyzing the recognized symbol of the received handwritten data in order to detect potential misrecognition includes the step of:

determining that the recognized symbol was likely unintended by the computer user if the recognized symbol contains a gesture.

5. The method as recited in claim 1 wherein the step of analyzing the recognized symbol of the received handwritten data in order to detect potential misrecognition includes the step of:

determining that the recognized symbol was likely unintended by the computer user if the recognized symbol is unrecognizable.

6. The method as recited in claim 1 wherein the step of analyzing the recognized symbol of the received handwritten data in order to detect potential misrecognition includes the step of:

determining that the recognized symbol was likely unintended by the computer user if the recognized symbol contains a non-alphanumeric character.

7. The method as recited in claim 1 wherein the output device is a screen display, wherein the step of outputting an indication includes the step of:

displaying a window on the screen display which contains the recognized symbol.

8. The method as recited in claim 7 wherein the step of displaying the window includes the step of:

displaying a pop-up window with an accept button and a reject button, wherein the user may accept the recognized symbol by activating the accept button and reject the recognized symbol by activating the reject button.

9. The method as recited in claim 1 wherein the step of outputting an indication includes the step of:

outputting audible signals that indicate that the recognized symbol was likely unintended by the computer user.

10. A pen-based computer system for accepting handwritten data, comprising:

a pen input device;

an application program for receiving and displaying recognized symbols, each recognized symbol containing at least one recognized character in a human-readable form;

a control unit in the computer system having a component for receiving handwritten data comprising at least one handwritten character from the pen input device, a component for determining when a recognized symbol is likely unintended by a computer user by examining the recognized symbol, a component for querying the computer user whether to accept the recognized symbol when the recognized symbol was likely unintended by the computer user, a component for soliciting a different handwritten symbol from the computer user when the user does not accept the recognized symbol, and a component for sending the recognized symbol to the application program when the recognized symbol was not likely unintended by the computer user, wherein the application program displays the recognized symbol;

a translation unit in the computer system for converting handwritten data received from the control unit into recognized symbols; and a processing unit in the computer system for receiving recognized symbols from the control unit and for processing the recognized symbols.

11. In a computer system, the computer system having a pen input device used by a computer user for inputting handwritten data into the computer system, a recognizer program for converting the handwritten data into text and commands, a control program for receiving handwritten data from the pen input device and for invoking the recognizer program, an application program for receiving the converted text and commands, and for displaying the converted text and executing the commands, and a central processing unit for executing the control program, the recognizer program and the application program, a method comprising the steps of:

receiving handwritten data containing at least one handwritten character from a pen input device and supplying the handwritten data to the control program;

converting the handwritten data into converted data containing a converted character that is human-readable by the recognizer program after receiving the handwritten data from the control program;

determining by the control program if the converted data was likely unintended by the computer user by examining the converted character after receiving the converted data from the recognizer program;

when the converted data was likely unintended by the computer user, displaying by the control program a pop-up window to the computer user wherein the computer user can accept or reject the converted data;

when the user accepts the converted data, sending the converted data from the control program to the application program, wherein the application program displays the converted data;

when the user rejects the converted data, discarding the converted data; and when the converted data was not likely unintended by the computer user, sending the converted data from the control program to the application program, wherein the application program displays the converted data.

12. The method as recited in claim 11 wherein the step of determining by the control program includes the step of:

determining if the converted data has more than a predetermined number of characters.

13. The method as recited in claim 11 wherein the step of determining by the control program includes the step of:

determining that the converted data was likely unintended by the computer user if the converted data contains one character that is part of a set of characters that is likely to be misrecognized.

14. The method as recited in claim 11 wherein the handwritten data includes gestures, and wherein the step of determining by the control program includes the step of:

determining that the converted data was likely unintended by the computer user when the converted data contains a gesture.

15. The method as recited in claim 11 wherein the step of determining by the control program includes the step of:

determining that the converted data was likely unintended by the computer user if the converted character is unrecognizable.

16. The method as recited in claim 11 wherein the step of determining by the control program includes the step of:

determining that the converted data was likely unintended by the computer user if a character is non-alphanumeric.

17. A computer system for accepting handwritten data, the computer system comprising:

a pen input device for receiving handwritten data and supplying the handwritten data to a control program;

a recognizer program for receiving the handwritten data from the control program and for converting the handwritten data into one or more recognized symbols;

a control program for receiving handwritten data containing at least one handwritten character from the pen input device, for sending the received handwritten data to the recognizer program for conversion into one or more recognized symbols containing a converted character in a human-readable form, for receiving the recognized symbols from the recognizer program, for determining if one or more recognized symbols were likely unintended by a computer user by examining the one or more recognized symbols, and for displaying a pop-up window containing the one or more recognized symbols to the computer user wherein the computer user can accept or reject the one or more recognized symbols when the converted data was likely unintended by the computer user, wherein the pop-up window displays the one or more recognized symbols;

means for sending the one or more recognized symbols from the control program to an application program when the computer user accepts the one or more recognized symbols;

means for discarding the one or more recognized symbols when the computer user rejects the one or more recognized symbols; and an application program for receiving the one or more recognized symbols when the computer user accepts the one or more recognized symbols.

18. In a computer system, a method comprising the steps of:

receiving handwritten data containing at least one handwritten character and supplying the handwritten data to the computer system;

mapping the handwritten data onto pre-stored symbols for recognition;

converting the handwritten data to one or more recognized symbols containing a recognized character in a human-readable form using the mapped, prestored symbols;

determining if the one or more recognized symbols were likely unintended by the computer user by examining the recognized character;

displaying the one or more recognized symbols in an indication when the one or more recognized symbols were likely unintended by the computer user that allows the computer user to either accept or reject the one or more recognized symbols;

when the user accepts the one or more recognized symbols, providing the recognized symbol as a recognition of the received handwritten data; and when the user rejects the one or more recognized symbols, discarding the one or more recognized symbols.

19. The method as recited in claim 18 wherein the step of determining includes the step of:

determining if the one or more recognized symbols have more than a predetermined number of characters.

20. The method as recited in claim 18 wherein the step of determining includes the step of:

determining that the one or more recognized symbols were likely unintended by the computer user if the one or more recognized symbols contain one character that is part of a set of characters that are likely misrecognized.

21. The method as recited in claim 18 wherein the handwritten data includes gestures, and wherein the step of determining includes the step of:

determining that the one or more recognized symbols were likely unintended by the computer user when the one or more recognized symbols contain a gesture.

22. The method as recited in claim 18 wherein the step of determining includes the step of:

determining that the one or more recognized symbols were likely unintended by the computer user if a recognized character within the one or more recognized symbols is unrecognizable.

23. The method as recited in claim 18 wherein the step of determining includes the step of:

determining that the one or more recognized symbols were likely unintended by the computer user if a character within the one or more recognized symbols is non-alphanumeric.

* * * * *